(12) United States Patent
Trainer et al.

(10) Patent No.: US 12,525,792 B2
(45) Date of Patent: Jan. 13, 2026

(54) CURRENT LIMITING DIODE

(71) Applicant: Rolls-Royce plc, London (GB)

(72) Inventors: David R Trainer, Derby (GB); Francisco Javier Chivite Zabalza, Stafford (GB); Mark Sweet, Chesterfield (GB); Gian Incerpi, Buckingham (GB)

(73) Assignee: ROLLS-ROYCE PLC, London (GB)

( * ) Notice: Subject to any disclaimer, the term of this patent is extended or adjusted under 35 U.S.C. 154(b) by 627 days.

(21) Appl. No.: 17/957,273

(22) Filed: Sep. 30, 2022

(65) Prior Publication Data
US 2023/0137501 A1 May 4, 2023

(30) Foreign Application Priority Data
Oct. 28, 2021 (GB) ...................................... 2115514

(51) Int. Cl.
*H02H 9/02* (2006.01)
*G05F 3/24* (2006.01)

(52) U.S. Cl.
CPC ............. *H02H 9/025* (2013.01); *G05F 3/242* (2013.01)

(58) Field of Classification Search
None
See application file for complete search history.

(56) References Cited

U.S. PATENT DOCUMENTS

| | | | |
|---|---|---|---|
| 2003/0202306 A1* | 10/2003 | Dubhashi | ............ H01L 23/4275 257/E23.089 |
| 2014/0209852 A1* | 7/2014 | Schulze | ............... H10D 12/481 257/5 |
| 2015/0043114 A1 | 2/2015 | Sarkar et al. | |
| 2015/0236142 A1 | 8/2015 | Laven et al. | |
| 2016/0163689 A1 | 6/2016 | Aven et al. | |
| 2017/0179946 A1 | 6/2017 | Turvey | |
| 2023/0136376 A1* | 5/2023 | Trainer | ............. H02M 3/33573 307/9.1 |

FOREIGN PATENT DOCUMENTS

| | | |
|---|---|---|
| WO | 03/073475 A2 | 9/2003 |
| WO | 2009/060168 A1 | 5/2009 |

OTHER PUBLICATIONS

Mar. 30, 2022 Search Report issued in GB Patent Application No. 2115514.8.
Mar. 22, 2023 Extended European Search Report Issued in European Patent Application No. 22198315.8.
Shao et al., "Power Modules for Pulsed Power Applications Using Phase Change Material," 2018 Second International Symposium on 3D Power Electronics Integration and Manufacturing, IEEE, pp. 1-6.

* cited by examiner

*Primary Examiner* — Hung K Vu
(74) *Attorney, Agent, or Firm* — Oliff PLC

(57) ABSTRACT

There is provided a current limiting diode comprising a gate, a source, and a drain electrically connected to the source by an n-channel or p-channel; wherein the source and the gate are electrically connected by a fill structure comprising a phase-change fill material, and wherein the phase-change fill material is configured to absorb heat from the n-channel or p-channel by changing phase.

15 Claims, 10 Drawing Sheets

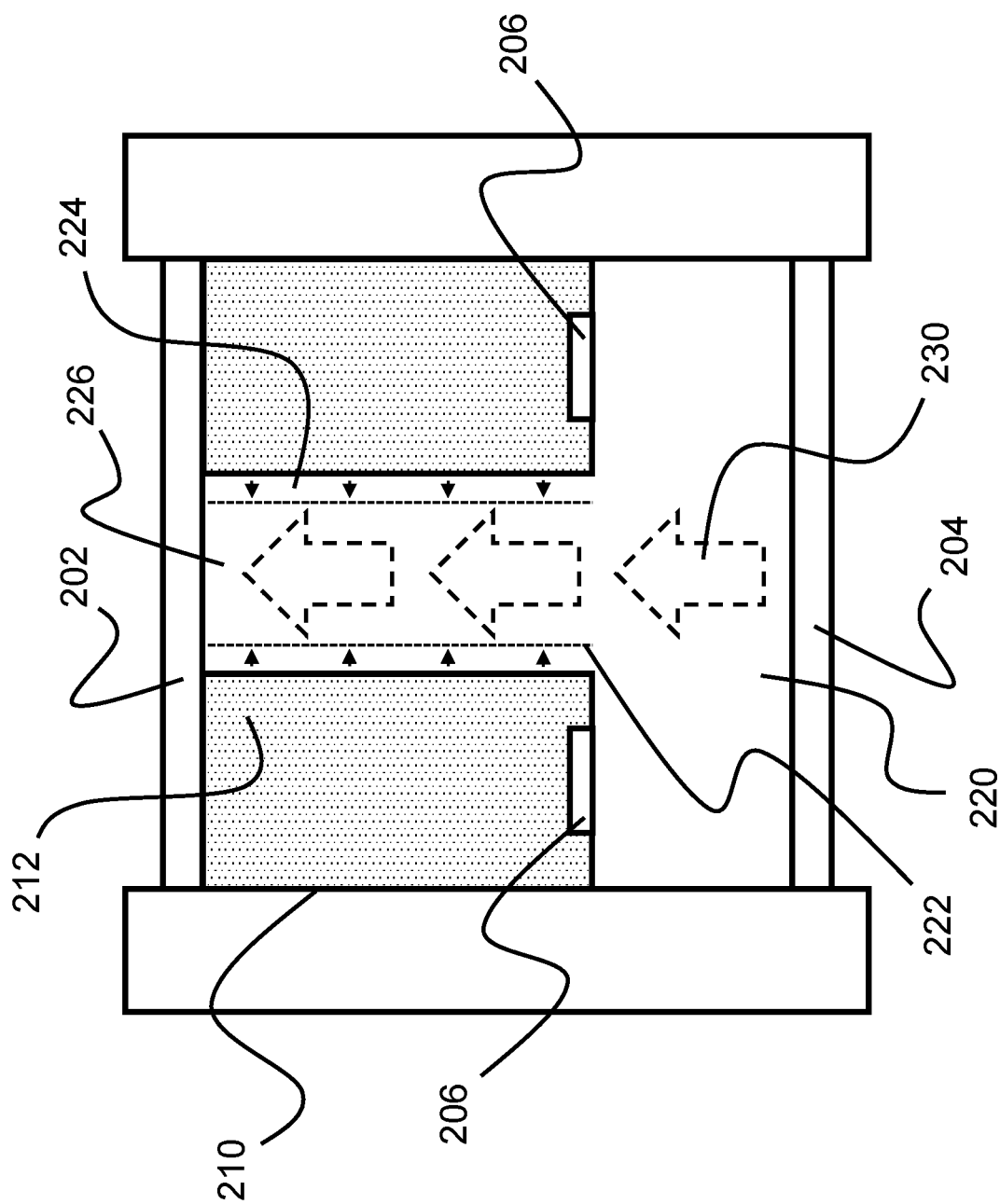

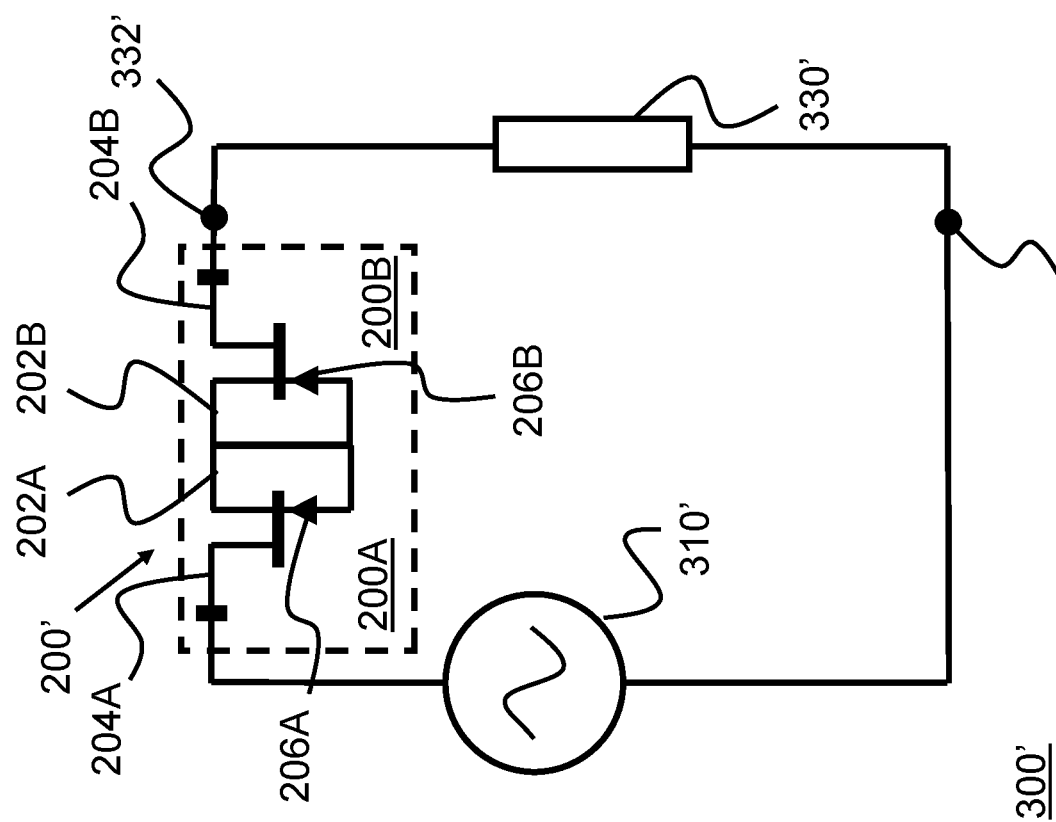
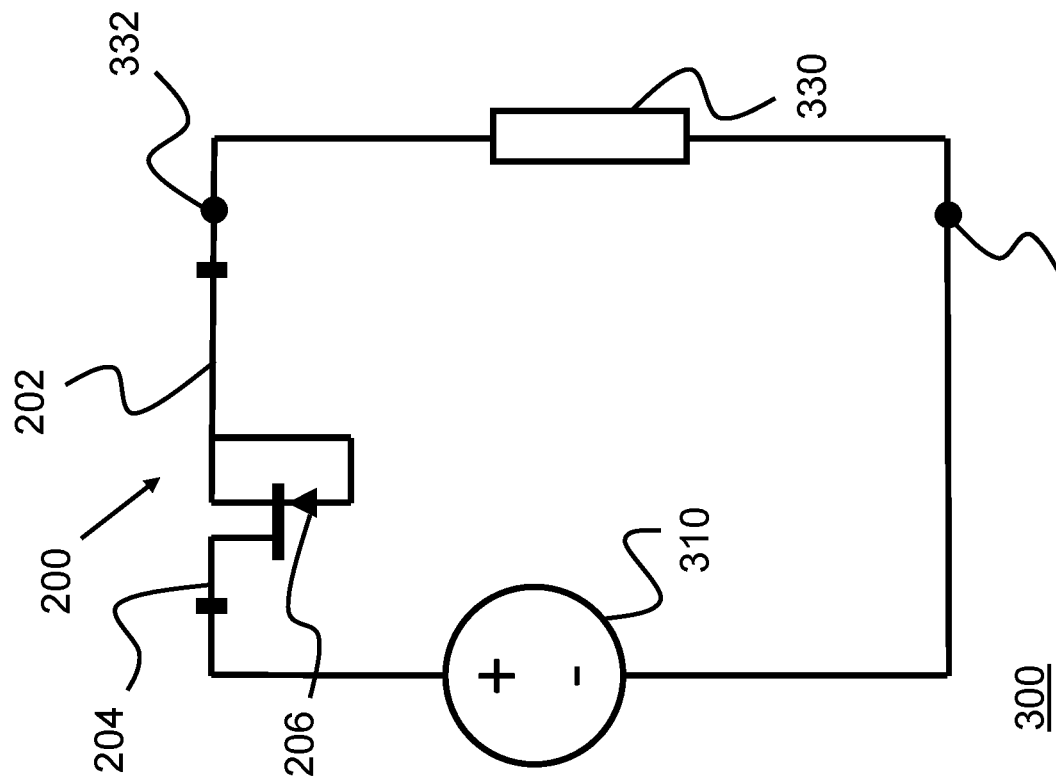
FIG. 7
FIG. 6

CURRENT LIMITING DIODE

CROSS-REFERENCE TO RELATED APPLICATIONS

This specification is based upon and claims the benefit of priority from United Kingdom Patent Application No. 2115514.8, filed on 28 Oct. 2021, the entire contents of which are incorporated herein by reference.

FIELD OF THE DISCLOSURE

The present disclosure relates to a current limiting diode.

BACKGROUND

Current limiting diodes using both silicon and silicon carbide junction field-effect transistors (JFETs) are widely known. They are configured as 2-terminal devices which "saturate" at a near constant current level and are sometimes referred to as constant-current diodes. As such, they essentially function as highly non-linear resistors which increase in resistance very rapidly in response to a very large increase in an electrical current. The increase in electrical resistance moderates a magnitude of the electrical current while dissipating energy in the form of heat, which increases an internal temperature of the current limiting diode.

If a current limiting diode is operated above a threshold temperature for a significant period of time, damage to or loss of function of the current limiting diode may follow as a result. It is therefore advantageous to provide means for cooling a current limiting diode to prevent a rise in the internal temperature of the current limiting diode above the threshold temperature.

SUMMARY

According to a first aspect there is provided a current limiting diode comprising a gate, a source, and a drain electrically connected to the source by an n-channel or p-channel; wherein the source and the gate are electrically connected by a fill structure comprising a phase-change fill material, and wherein the phase-change fill material is configured to absorb heat from the n-channel or p-channel by changing phase.

It may be that the phase-change fill material is configured to absorb heat from the n-channel or p-channel by changing phase in an extreme operating condition. It may be that the phase-change fill material is configured to absorb heat from the n-channel or p-channel by changing phase when a current conducted by the current limiting diode exceeds a threshold or when a temperature of the n-channel or p-channel exceeds a threshold.

It may be that the phase-change material abuts the n-channel or p-channel for heat exchange therebetween.

It may also be that the phase-change fill material comprises a material which is in a substantially solid phase at or about 125° C. but which transitions to a substantially liquid phase at a temperature which is greater than 125° C.

The fill structure further may comprise a solid-phase fill material which is configured to remain in a solid phase as the phase-change fill material changes phase.

Further, it may be that the drain and/or the source is provided with a heat sink comprising a phase-change heat sink material configured to absorb heat from the n-channel or p-channel via the drain and/or the source by changing phase.

The phase-change heat sink material may comprise a material which is in a substantially solid phase at or about 125° C. but which transitions to a substantially liquid phase at a temperature which is greater than 125° C.

It may be that the heat sink comprises a solid-phase heat sink material which is configured to remain in a solid phase as the phase-change heat sink material changes phase.

It may be that the drain is electrically connected to the source by an n-channel.

According to a second aspect, there is provided a bidirectional current limiting device comprising a first current limiting diode and a second current limiting diode, wherein: each current limiting diode is in accordance with the first aspect; and the source of the first current limiting diode is electrically connected to the source of the second current limiting diode.

According to a third aspect there is disclosed an electrical power system comprising: the current limiting diode in accordance with the first aspect or the bidirectional current limiting device in accordance with the second aspect; an electrical power source; and an electrical network, and wherein the current limiting diode or the bidirectional current limiting device is configured to limit a fault current passing between the electrical power source and the electrical load network in a fault condition.

The electrical power system may further comprise a controllable circuit interruption device configured to interrupt the fault current in response to a determination that the electrical power system is in the fault condition. The controllable circuit interruption device may, for example, be a contactor (e.g. a DC contactor) or a semiconductor device such as a solid-state circuit breaker.

It may be that the electrical energy source comprises a battery (e.g. a high-density battery). It may also be that the electrical power system further comprises a power electronics converter.

According to a fourth aspect, there is provided an aircraft power and propulsion system comprising the current limiting diode in accordance with the first aspect, the bidirectional current limiting device in accordance with the second aspect or the electrical power system of the third aspect.

According to a fifth aspect, there is provided an aircraft comprising the current limiting diode in accordance with the first aspect, the bidirectional current limiting device in accordance with the second aspect, the electrical power system of the third aspect or the aircraft power and propulsion system in accordance with the fourth aspect.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which:

FIG. 2A is a cross-sectional view of a first example current limiting diode in a normal operating condition;

FIG. 6 is a diagram which shows a first example electrical power system comprising a current limiting diode;

FIG. 7 is a diagram which shows a second example electrical power system comprising a bidirectional current limiting device;

DETAILED DESCRIPTION

Aspects and embodiments of the present disclosure will now be discussed with reference to the accompanying figures. Further aspects and embodiments will be apparent to those skilled in the art.

Figure 1A:
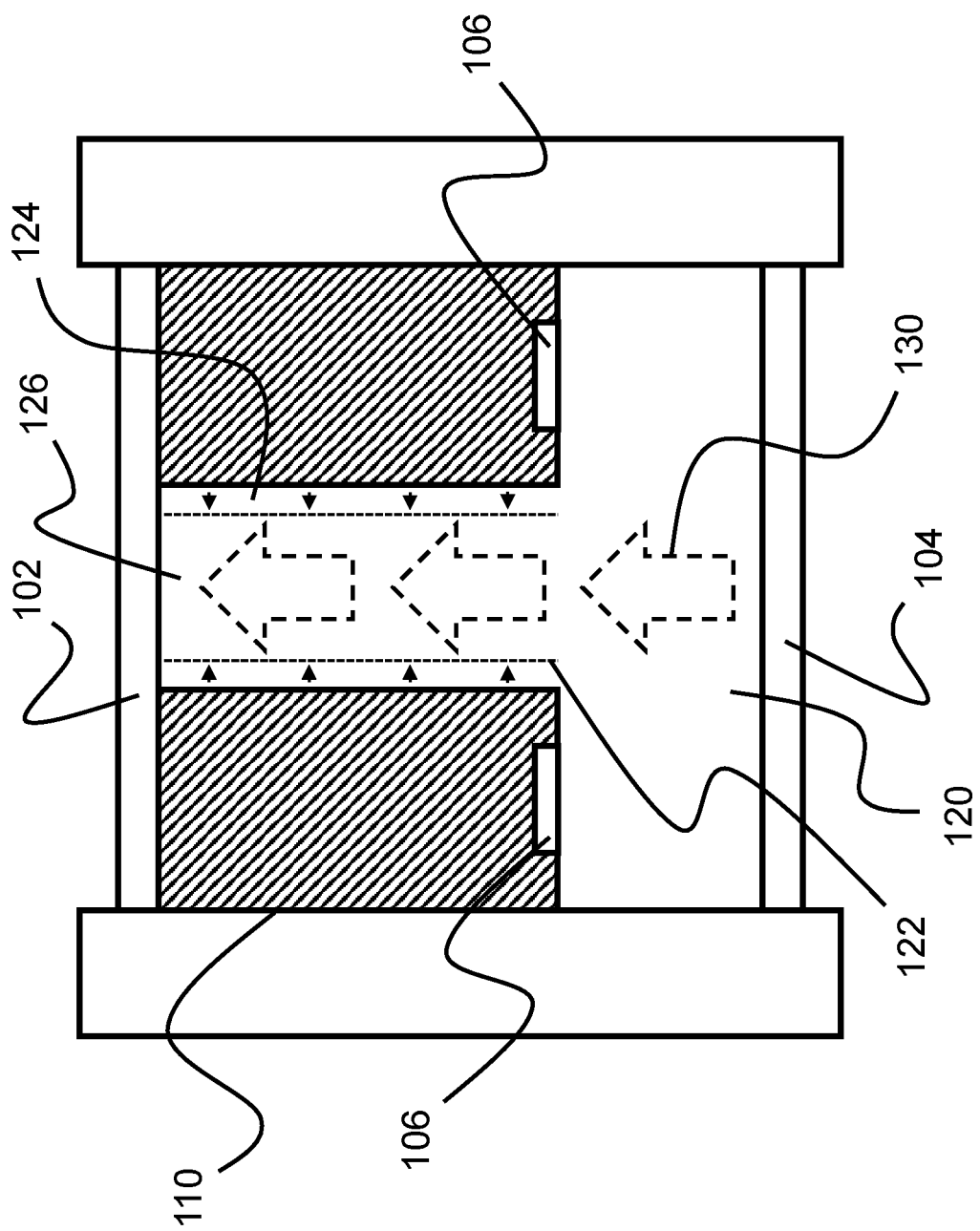
FIG. 1A is a cross-sectional view of a conventional current limiting diode in a normal operating condition.

FIG. 1A shows a cross-sectional view of a conventional current limiting diode 100 in a normal operating condition. The current limiting diode 100 comprises a junction field-effect transistor (JFET) provided with a source 102, a drain 104 and a gate 106, with the gate 106 being electrically connected to the source 102 by a fill structure 110 and the drain 104 being electrically connected to the source by an n-channel 120. Accordingly, the current limiting diode 100 is configured as a 2-terminal device which permits an electric current to be conducted through the n-channel 120 between the source 102 and the drain 104. In FIG. 1A, an electric current being conducted through the n-channel 120 between the source 102 and the drain 104 in the normal operating condition is represented by arrows 130.

The current limiting diode 100 has an electrical resistance which is primarily defined by a size of a depletion region 124 of the n-channel 120. The depletion region 124 is a region of the n-channel 120 in which there are no free charge carriers. As a result, an electric current cannot be conducted through the depletion region 124.

However, an electric current may be conducted through a current-carrying path 126 through the n-channel 120. In FIG. 1A, a boundary between the depletion region 124 and the current-carrying path 126 is represented by the dashed lines 122. The size of the depletion region 124 corresponds to a magnitude of an electric current being passed through the n-channel from the drain 104 to the source 102. That is to say that if the magnitude of the electric current passing through the n-channel from the drain 104 to the source 102 is large, the size of the depletion region 124 will also be large, the size of the current-carrying path 126 will be small and the electrical resistance of the current limiting diode 100 becomes large. However, the size of the depletion region 124 (and equally the size of the current-carrying path 126) does not correspond to a magnitude of an electric current being passed from the source 102 to the drain 104.

Figure 1B:
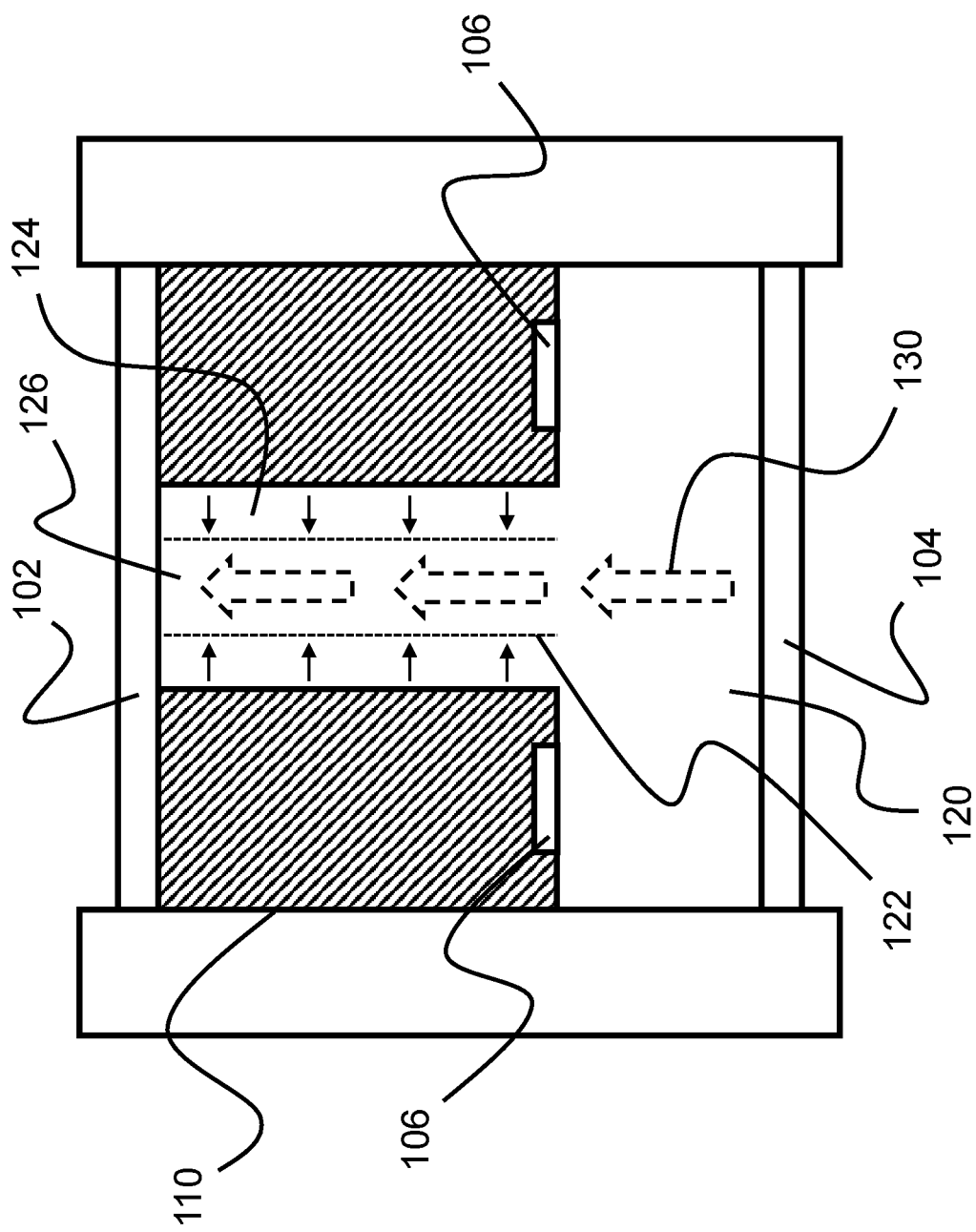
FIG. 1B is a cross-sectional view of the conventional current limiting diode shown in FIG. 1A in an extreme operating condition.

FIG. 1B shows a cross-sectional view of the conventional current limiting diode 100 shown in FIG. 1A in an extreme (i.e. abnormal) operating condition. In FIG. 1B, an electric current being conducted through the n-channel 120 between the source 102 and the drain 104 in the extreme operating condition is represented by arrows 130. The electric current being conducted through the n-channel 120 in the extreme operating condition may be a fault current which originates from an electrical power system in which the current limiting diode 100 is incorporated.

A relationship between the electrical resistance of the current limiting diode 100 and the magnitude of the electric current passing from the drain 104 to the source 102 is highly non-linear. In other words, the current limiting diode 100 operates in a manner which is analogous to a highly non-linear unidirectional resistor in that the electrical resistance of the current limiting diode 100 increases very rapidly as the magnitude of the electric current passing from the drain 104 to the source 102 increases above a saturation threshold. Accordingly, the current limiting diode 100 "saturates" at a near constant current level.

In the normal operating condition shown in FIG. 1A, a magnitude of an electric current being conducted through the current limiting diode 100 from the drain 104 to the source 102 is relatively low. Accordingly, the size of the depletion region 124 within the n-channel 120 is relatively small, the size of the current-carrying path 126 is relatively large and the electrical resistance of the current limiting diode 100 is also relatively small. Therefore, an amount of resistive heat dissipated by the current limiting diode 100 in the normal operating condition is low.

In the extreme operating condition shown in FIG. 1B, the magnitude of the electric current being conducted through the current limiting diode 100 from the drain to the source is relatively high. Accordingly, the size of the depletion region 124 within the n-channel 120 is relatively large, the size of the current-carrying path 126 is relatively small and the electrical resistance of the current limiting diode 100 is also relatively large. Therefore, an amount of resistive heat dissipated by the current limiting diode 100 in the extreme operating condition is high. Because only the current-carrying path 126 permits an electrical current to be conducted through it, the resistive heat is primarily generated within the current-carrying path 126. In both the normal operating condition and the extreme operating condition, the resistive heat generated within the current-carrying path 126 causes an internal temperature profile to develop within the current limiting diode 100.

The current limiting diode 100 is cooled by means of conduction and/or convection to an environment. Consequently, in order to effectively dissipate the resistive heat in the extreme operating condition, a maximum internal temperature of the current limiting diode 100 must rise substantially in the extreme operating condition. The maximum internal temperature of the current limiting diode 100 corresponds to a maximum of the internal temperature profile.

In practice, a resistive heat dissipation rate of the n-channel 120 in the extreme operating condition may be sufficiently high that the maximum internal temperature of the current limiting diode 100 rises above a threshold temperature at which damage to and loss of function of the current limiting diode 100 may occur. The maximum internal temperature of the current limiting diode 100 may rise above the threshold temperature within a number of milliseconds of the development of a fault current which places the current limiting diode 100 in the extreme operating condition if the fault current is not interrupted. A duration between the development of the fault current and a time at which the maximum internal temperature exceeds the threshold temperature is referred to as a critical time period.

FIG. 2A shows a cross-sectional view of a first example current limiting diode 200 in a normal operating condition.

The current limiting diode 200 comprises a junction field-effect transistor (JFET) provided with a source 202, a drain 204 and a gate 206, with the gate 206 being electrically connected to the source 202 by a fill structure 210 and the drain 204 being electrically connected to the source by an n-channel 220. The fill structure 210 comprises a phase-change fill material 212. Accordingly, the current limiting diode 200 is configured as a 2-terminal device which permits an electric current to be conducted through the n-channel 220 between the source 202 and the drain 204. In FIG. 2A, an electric current being conducted through the n-channel 220 between the source 202 and the drain 204 in the normal operating condition is represented by arrows 230.

Figure 2B:
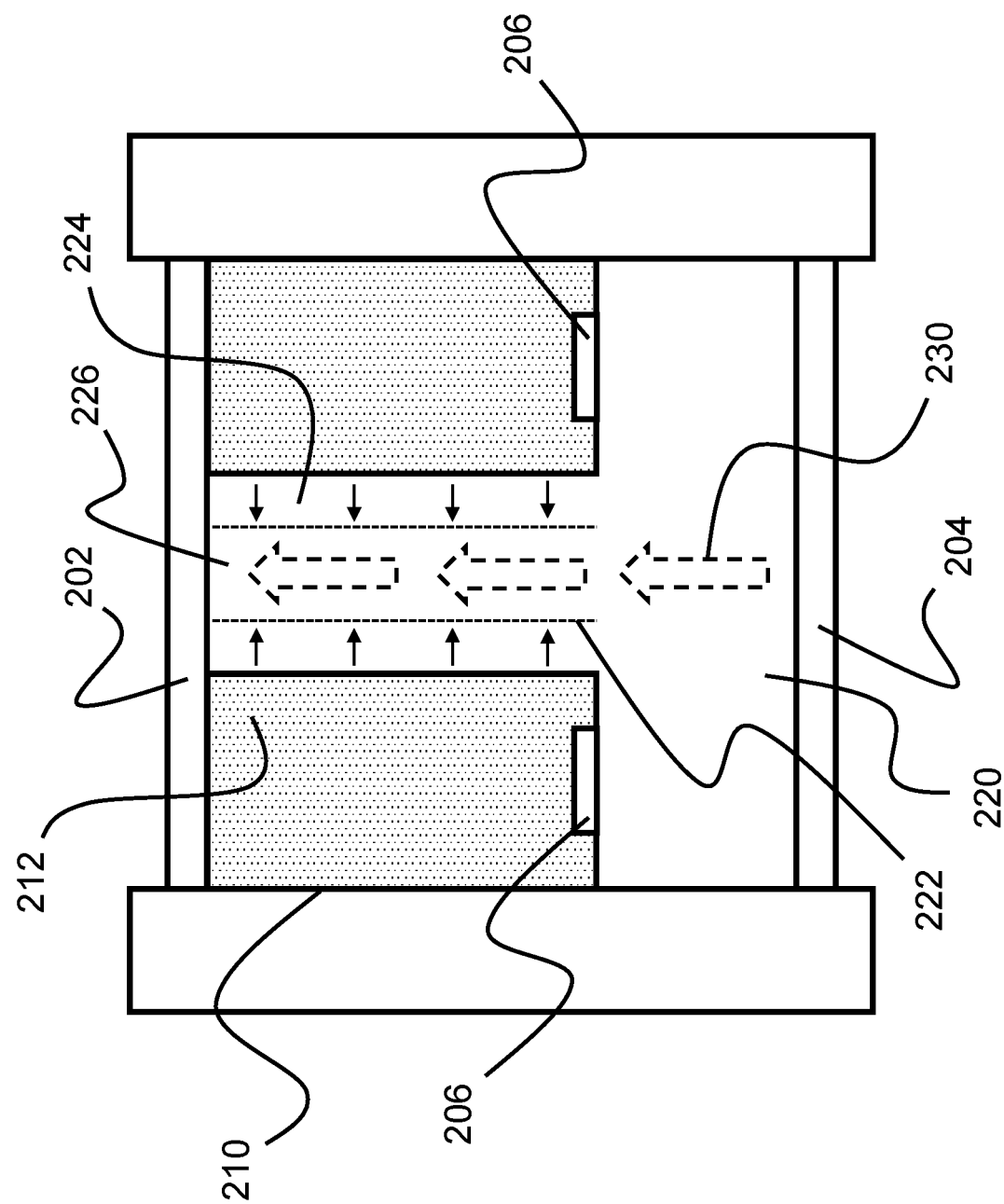
FIG. 2B is a cross-sectional view of the first example current limiting diode shown in FIG. 2A in an extreme operating condition.

FIG. 2B shows a cross-sectional view of the first example current limiting diode 200 shown in FIG. 2A in an extreme (i.e. abnormal) operating condition. In FIG. 2B, an electric current being conducted through the n-channel 220 between the source 202 and the drain 204 in the extreme operating condition is represented by arrows 230. The electric current being conducted through the n-channel 220 in the extreme operating condition may be a fault current which originates from an electrical power system in which the current limiting diode 200 is incorporated.

In a similar way to the conventional current limiting diode 100, the first example current limiting diode 200 has an electrical resistance which is primarily defined by a size of a depletion region 224 (and equally by a size of a current-carrying path 226) of the n-channel 220. The size of the depletion region 224 corresponds to a magnitude of an electric current being passed through the n-channel 220 from the drain 204 to the source 202. A relationship between the magnitude of the electric current being passed through the n-channel 220 from the drain 204 to the source 202 is very similar to the relationship described with respect to the conventional current limiting diode 100 with reference to FIGS. 1A and 1B. That is to say that the current limiting diode 200 operates in a manner which is analogous to a highly non-linear unidirectional resistor in that the electrical resistance of the current limiting diode 200 increases very rapidly as the magnitude of the electric current passing from the drain 204 to the source 202 increases above a saturation threshold.

The phase-change fill material 212 is configured to absorb heat from the n-channel 220 in the extreme operating condition (e.g. when a current conducted by the current limiting diode 200 exceeds a threshold or when a temperature of the n-channel 220 exceeds a threshold) by changing phase. Accordingly, the phase-change fill material 212 functions as an internal heat sink within the current limiting diode 200. In particular, the phase-change fill material 212 is configured to absorb heat energy from the n-channel 220 by means of a substantially constant-temperature heat absorption process. Consequently, the phase-change fill material 212 can absorb a significant amount of heat from the n-channel 220 without necessitating a rise in the maximum internal temperature of the current limiting diode 200. However, an ability of the phase-change fill material 212 to absorb heat is defined by a latent heat property of the phase-change fill material 212.

Further, the ability of the phase-change fill material 212 to absorb heat by changing phase is lost after the phase-change fill material 212 has entirely changed phase. Accordingly, after the phase-change fill material 212 has entirely changed phase, the current limiting diode 200 is only cooled by means of convection and/or conduction. Therefore, in order to dissipate the resistive heat in the extreme operating condition after the phase-change fill material 212 has entirely changed phase, the maximum internal temperature of the current limiting diode 200 must rise.

In both the normal operating condition and the extreme operating condition, the resistive heat generated within the current-carrying path 226 causes an internal temperature profile to develop within the current limiting diode 200. A maximum internal temperature of the current limiting diode 100 corresponds to a maximum of the internal temperature profile. In practice, a resistive heat dissipation rate of the n-channel 220 in the extreme operating condition may be sufficiently high such that the maximum internal temperature of the current limiting diode 200 rises above a threshold temperature at which damage to and loss of function of the current limiting diode 200 occurs. A duration between a development of a fault current which places the current limiting diode 200 in the extreme operating condition and a time at which the maximum internal temperature of the current limiting diode 200 exceeds the threshold temperature is referred to as a critical time period.

The heat absorbed by the phase-change fill material 212 in the extreme operating condition by means of the substantially constant-temperature heat absorption process lengthens the critical time period. A longer critical time period is associated with an improved durability of the current limiting diode 200 in the extreme operating condition, because the current limiting diode 200 can operate in the extreme operating condition for a longer period of time before damage to and loss of function of the current limiting diode 200 occurs.

As described above, the resistive heat generated by the current limiting diode 200 in the extreme operating condition is primarily generated within the current-carrying path 226. A maximum gradient of the internal temperature profile within the n-channel 220 may be minimised by configuring the phase-change fill material 212 to maximise a heat absorption rate from the pinch-off region 226 of the n-channel 220 in the extreme operating condition.

In order to increase the heat absorption rate from the pinch-off region 226, the phase-change fill material 212 is arranged around the n-channel in a manner which both reduces (e.g. minimises) a distance between the pinch-off region 226 and the phase-change fill material 212 and which increases (e.g. maximises) an interfacial surface area between the pinch-off region 226 and phase-change fill material 212. The phase-change material 212 shown in the example of FIGS. 2A and 2B is arranged within the current limiting diode 200 to achieve this effect, although it will be appreciated that other configurations which achieve this effect are possible. In particular, a geometry of the current limiting diode 200 and the n-channel 220 may necessitate alternative configurations of the phase-change fill material in order to increase the heat absorption rate from the pinch-off region 226 in the extreme operating condition.

The phase-change material 212 abuts the n-channel 220 for heat exchange therebetween, as shown in the example of FIGS. 2A and 2B. Such an arrangement provides effective heat exchange between the n-channel 220 and the phase-change material 212 and ensures that a maximum gradient of the internal temperature profile within the n-channel 220 is reduced.

As described above, the phase-change fill material 212 is configured to absorb heat from the n-channel 220 in an extreme operating condition by changing phase. Accordingly, the phase-change fill material 212 comprises a material which is substantially in a first phase in the normal operating condition but which substantially transitions to a second phase in the extreme operating condition. In a preferred example, the phase-change fill material 212 comprises a material which is substantially in a solid phase in the normal operating condition but which transitions to a substantially liquid phase in the extreme operating condition.

A typical operating temperature of a JFET is approximately 125° C. in a normal operating condition. In the normal operating condition, the maximum internal temperature of the current limiting diode 200 may therefore be at or about 125° C. Consequently, the phase-change fill material 212 may preferably comprise a material which is in a substantially solid phase at or about 125° C. but which transitions to a substantially liquid phase at a temperature which is greater than 125° C. Many materials which meet the above requirement will be known and apparent to those skilled in the art.

For better operation of the current limiting diode 200, a change in phase of the phase-change fill material 212 should not significantly weaken or disrupt the electrical connection between the source 202 and gate 206 provided by the fill structure 210. In some examples, the phase-change material 212 may comprise a material which, when substantially in the second phase, has an electrical conductivity which allows the electrical connection between the source 202 and the gate 206 provided by the fill structure 210 to be preserved in the extreme operating condition.

Figure 3:
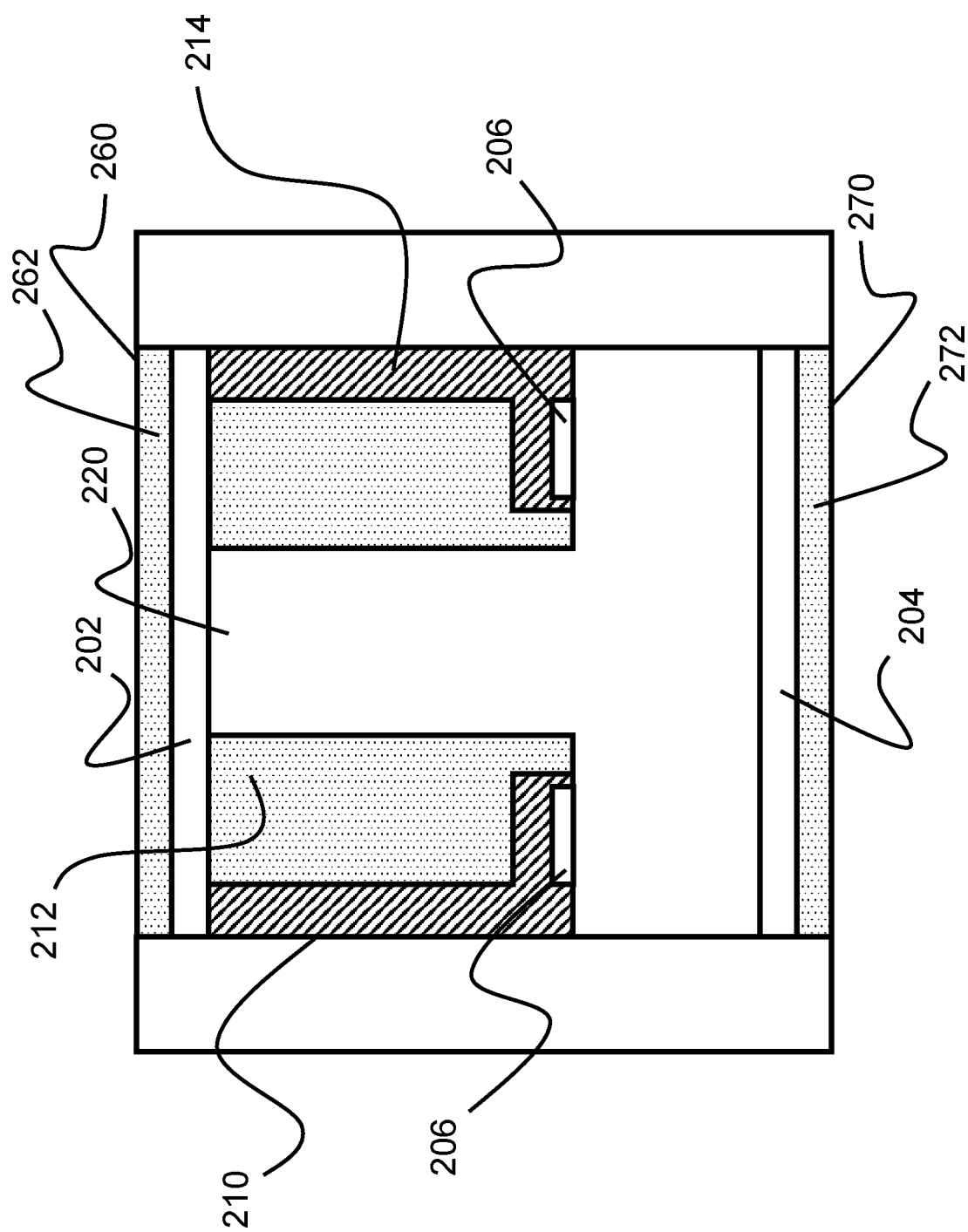
FIG. 3 is a cross-sectional view of a second example current limiting diode.

FIG. 3 shows a cross-sectional view of a second example current limiting diode 200. In the example of FIG. 3, the fill structure 210 further comprises a solid-phase fill material 214 which is configured to remain in a solid phase as the phase-change fill material 212 changes phase in the extreme operating condition. The solid-phase fill material ensures that the electrical connection between the source 202 and the gate 206 provided by the fill structure 210 is preserved in the extreme operating condition irrespective of the electrical conductivity of the phase-change fill material 212 when substantially in the second phase. The provision of the solid-phase fill material 214 allows a wider range of materials to be used as part of the phase-change fill material 212.

In particular, the provision of the solid-phase fill material 214 may allow a choice of a material for inclusion in the phase-change fill material 212 which results in the phase-change fill material 212 having a very high latent heat property and therefore a very large ability to absorb heat by changing phase. Consequently, the arrangement of FIG. 3 may enable the phase-change fill material 212 to be configured to absorb more heat from the n-channel 220 of the current limiting diode 200 in the extreme operating condition and thereby further lengthen the critical time period.

FIG. 3 also shows two additional (optional) heat sinks. The source 202 is provided with a source heat sink 260 comprising a source phase-change heat sink material 262 configured to absorb heat from the n-channel 220 via the source 202 in the extreme operating condition by changing phase. Likewise, the drain 204 is provided with a drain heat sink 270 comprising a drain phase-change heat sink material 272 configured to absorb heat from the n-channel 220 via the drain 202 in the extreme operating condition by changing phase. Like the phase-change fill material 212 described above, the source phase-change heat sink material 262 and the drain phase-change heat sink material 272 are configured to absorb heat energy from the n-channel 220 by means of a substantially constant-temperature heat absorption process.

The heat absorbed by the drain phase-change heat sink material 272 and/or the source phase-change heat sink material 262 from the n-channel 220 in the extreme operating condition by means of the substantially constant-temperature heat absorption process further lengthens the critical time period of the current limiting diode 200. While FIG. 3 shows the current limiting diode 200 as being provided with both the source heat sink 260 and the drain heat sink 270, it will be appreciated that the current limiting diode 200 may be provided with only the source heat sink 260 or the drain heat sink 270.

The source phase-change heat sink material 262 and/or the drain phase-change heat sink material 272 may comprise a similar material to or the same material as the phase-change fill material 212 described with respect to FIGS. 2A and 2B above. In a particular example, the source phase-change heat sink material 262 and/or the drain phase-change heat sink material 272 may comprise a material which is in a substantially solid phase at or about 125° C. but which transitions to a substantially liquid phase at a temperature which is greater than 125° C.

For better operation of the current limiting diode 200, a change in phase of the source phase-change heat sink material 262 should not significantly weaken or disrupt an electrical connection between the drain 204 and an external electrical connection.

Figure 4:
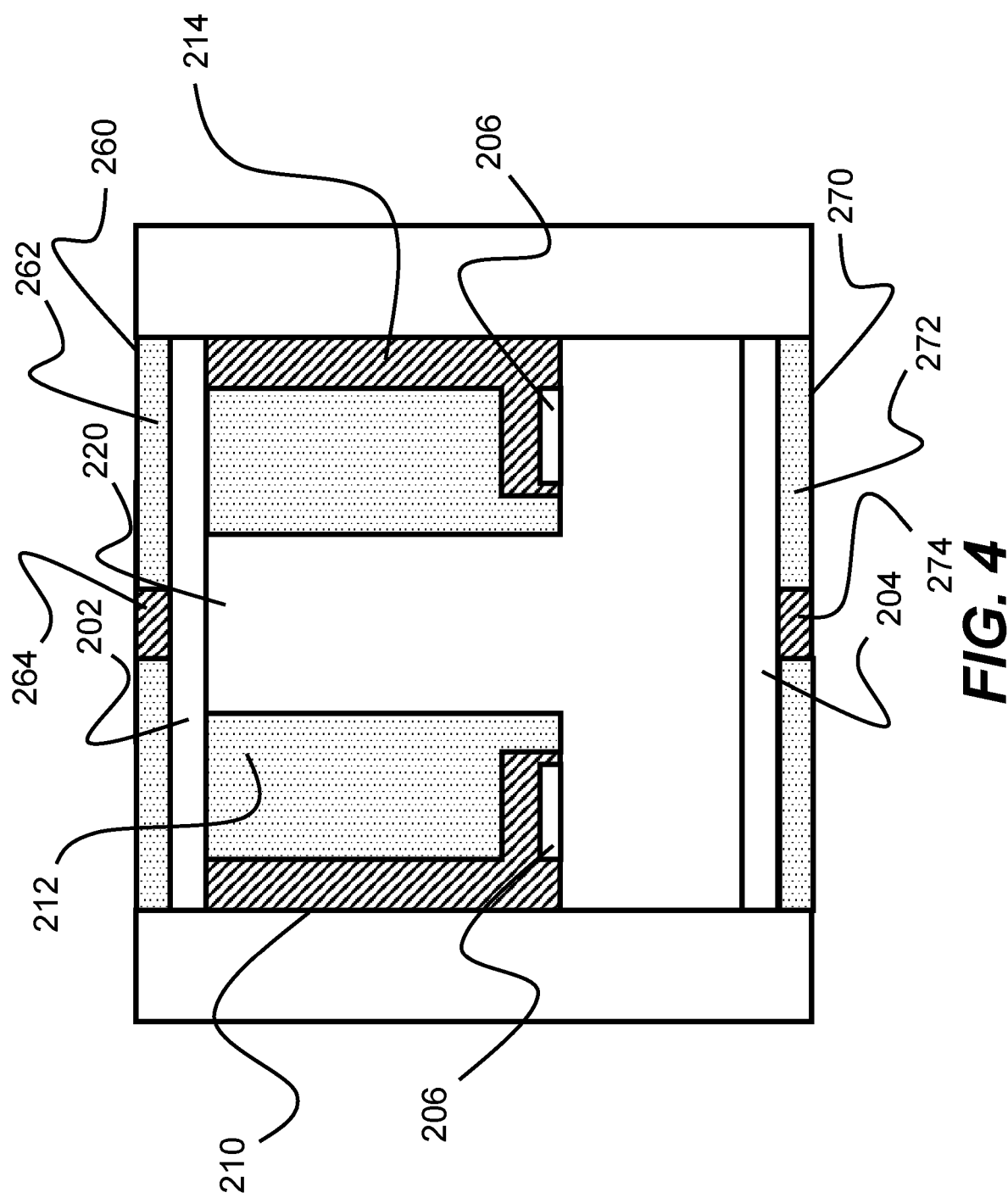
FIG. 4 is a cross-sectional view of a third example current limiting diode.

FIG. 4 shows a cross-sectional view of a third example current limiting diode 200 in which the source heat sink 260 further comprises a source solid-phase heat sink material 264 which is configured to remain in a solid phase as the source phase-change heat-sink material 262 changes phase in the extreme operating condition. For the same purpose, the drain heat sink 270 also comprises a drain solid-phase heat sink material 274 which is configured to remain in a solid phase as the drain phase-change heat-sink material 272 changes phase in the extreme operating condition. Generally, the function and advantages of the provision of the source solid-phase heat sink material 264 and/or the drain solid-phase heat sink material 274 correspond to those described above with respect to the solid-phase fill material 214.

Figure 5:
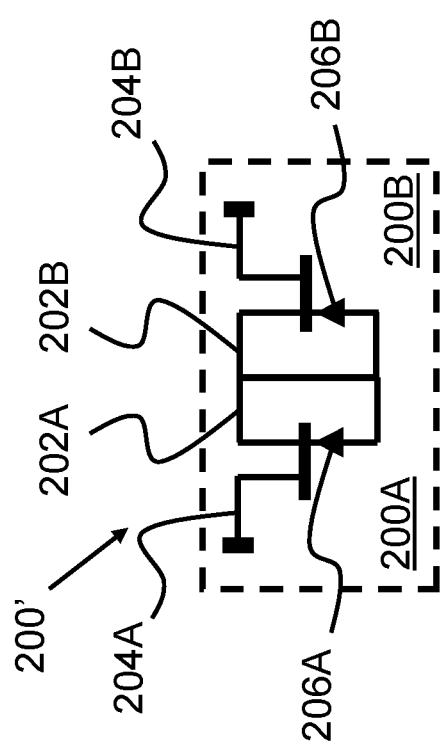
FIG. 5 is an electrical circuit symbol which represents a bidirectional current limiting device.

FIG. 5 shows a bidirectional current limiting device 200'. The bidirectional current limiting device 200' comprises a first current limiting diode 200A and a second current limiting diode 200B. Each current limiting diode is in accordance with any of the example current limiting diodes described above with reference to FIGS. 2-4.

In the example of FIG. 5, the first current limiting diode 200A is shown as being provided with a source 202A, a drain 204A and a gate 206A. Likewise, the second current limiting diode 200B is shown as being provided with a source 202B, a drain 204B and a gate 206B.

The source 202A of the first current limiting diode 200A and the source 202B of the second current limiting diode 200B are electrically connected in series. As such, the first current limiting diode 200A and the second current limiting diode 200B are electrically connected so as to form the bidirectional current limiting device 200'. Accordingly, the bidirectional current limiting device 200' is configured as a 2-terminal device which permits an electric current to be conducted between the drain 204A of the first current limiting diode 200A and the drain 204B of the second current limiting diode 200B through the n-channel of each current limiting diode.

A relationship between an electrical resistance of the bidirectional current limiting device 200' and a magnitude of an electric current passing from the drain 204A to the source 202A of the first current limiting diode 200A is highly non-linear. Similarly, a relationship between the electrical resistance of the bidirectional current limiting device 200' and a magnitude of an electric current passing from the drain 204B to the source 202A of the second current limiting diode 200B is highly non-linear.

In other words, the bidirectional current limiting device 200' operates in a manner which is analogous to a highly non-linear bidirectional resistor in that the electrical resistance of the bidirectional current limiting device 200' increases rapidly as the magnitude of an electric current passing through the bidirectional current limiting device 200' in either direction increases above a saturation threshold. Accordingly, the bidirectional current limiting device 200' "saturates" at a near constant current level, irrespective of a direction of the electric current passing through the bidirectional current limiting device 200'.

In all examples described above, the channel that connects the source and drain of each current limiting diode 200 is an n-channel. Those skilled in the art will appreciate that the channel could, in principle, instead be a p-channel, doped such that the majority carriers are 'holes' instead of electrons. The mobility of charge carriers in n-channel devices is typically significantly higher than those in p-channel devices, however, such that n-channel devices are generally preferred.

FIG. 6 is a diagram of a first example electrical power system 300 comprising a current limiting diode 200 in accordance with any of the example current limiting diodes described above with reference to FIGS. 2-4. The electrical power system 300 further comprises an electrical power source 310 which is configured to supply an electrical power to the electrical power system 300 and an electrical network 330 connected between terminals 332 and 334. In the example of FIG. 6, the electrical network is represented by a load 330. The electrical network 330 may comprise, for example, at least one electrical load. The electrical network 330 may be a DC electrical network or an AC electrical network.

In a normal operating condition of the first electrical power system 300, a magnitude of an electric current being conducted through the current limiting diode 200 from the drain to the source is relatively low. Accordingly, the size of the depletion region within the current limiting diode 200 is relatively small and the electrical resistance of the current limiting diode 200 is also relatively small. Therefore, a resistive heat dissipated by the current limiting diode 200 when the electrical power system 300 is in the normal operating condition is low. As a result, a power insertion loss associated with the inclusion of the current limiting diode 200 within the electrical power system 300 is minimised in the normal operating condition.

On the other hand, in a fault condition of the first electrical power system 300, a magnitude of an electric current being conducted through the current limiting diode 200 from the drain 204 to the source 202 may become extremely large in a very short period of time.

For example, if an internal impedance of the electrical energy storage device 310 is low and an electrical energy delivery capacity of the electrical energy storage device 310 is high, a fault in the electrical power system 300 which originates in the electrical network 330 and which presents an effective short circuit across the electrical energy storage device 310 may cause a magnitude of a fault current to be conducted through the electrical power system 300 which reaches an order of thousands of Amperes within a short period of time. This may be because the magnitude of the fault current is only limited by the internal impedance of the electrical energy storage device 310. If the magnitude of the fault current were not limited, the magnitude of the fault current could rise beyond a tolerance limit of the electrical power source 310 and/or a component of the electrical network 330.

In this example, the fault originates from the electrical network 330 and the fault current is therefore conducted through the current limiting diode 200 from the drain 204 to the source 202. If the fault current exceeds the saturation threshold of the current limiting diode 200, the current limiting diode 200 almost instantaneously limits the magnitude of the fault current by providing a greatly increased resistance through the n-channel 220. Accordingly, the current limiting diode 200 is configured to limit a fault current passing between the electrical power source 310 and the electrical network 330 in the fault condition. However, in another example, it may be that a fault originates from the electrical power source 310 and a fault current is therefore conducted through the current limiting diode 200 from the source 202 to the drain 204.

As mentioned above, the size of the depletion region of the n-channel 220 does not correspond to a magnitude of an electric current being passed from the source 202 to the drain 204. Therefore, in the configuration shown in FIG. 6, the current limiting diode 200 is not able to limit the magnitude of a fault current caused by a fault originating from the electrical power source 310. For this reason, an orientation of the current limiting diode 200 within the electrical power system 300 dictates whether the current limiting diode 200 is able to limit a fault current caused by a fault originating from the electrical network 330 or a fault current caused by a fault originating from the electrical power source 310. It will be appreciated that the current limiting diode 200 may be otherwise orientated within the electrical power system 300 such that the current limiting diode 200 is configured to limit a fault current caused by a fault originating from the electrical storage device 310.

In practice, the current limiting diode 200 is only able to respond to a development of the fault current caused by a fault originating from the electrical network 330 and to limit the fault current within a response time period of the current limiting diode 200. The response time period of the current limiting diode 200 may be, for example, of an order of a number of nanoseconds. Further, the current limiting diode 200 is configured to ensure that the magnitude of the fault current is maintained below the tolerance limit of the electrical power source 310 and/or a component of the electrical network 330.

In the example of FIG. 6, the electrical power source 310 is configured to provide a direct current to the electrical power system 300. However, it will be appreciated that the electrical power source 310 may equally be configured to provide another type of current to the electrical power system 300, such as an alternating current.

FIG. 7 is a diagram of a second example electrical power system 300' comprising a bidirectional current limiting device 200' in accordance with the example bidirectional current limiting device 200' described above with reference to FIG. 5. The electrical power system 300' further comprises an electrical power source 310' which is configured to supply an electrical power to the electrical power system 300' and an electrical network 330' connected between terminals 332' and 334'. Many of the components of the second example electrical power system 300' are similar to or identical to the components of the first electrical power system 300, with like reference numerals indicating similar or identical components.

The bidirectional current limiting device 200' is configured to limit the magnitude of a fault current caused by a fault originating from the electrical network 330' and/or to limit the magnitude of a fault current caused by a fault originating from the electrical power source 310' in a fault condition of the second electrical power system 300'. In other words, the bidirectional current limiting device 200' is able to limit a fault current caused by a fault originating from the electrical network 330' or a fault current caused by a fault originating from the electrical power source 310' irrespective of an orientation of the bidirectional current limiting device 200' within the electrical power system 300'. Accordingly, the bidirectional current limiting device 200' is configured to limit a fault current passing between the electrical power source 310' and the electrical network 330' in the fault condition.

Figure 8:
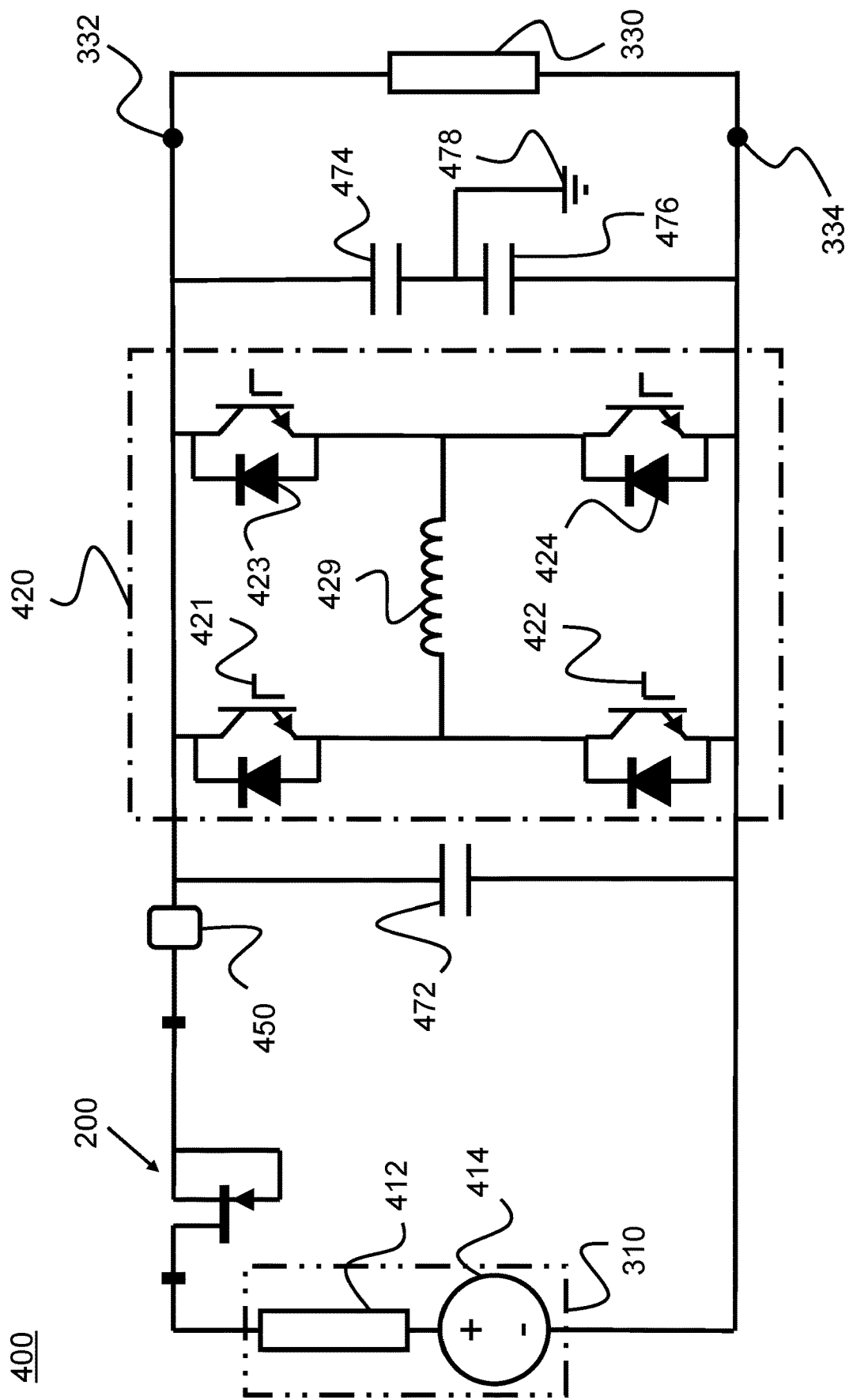
FIG. 8 is a diagram which shows a third example electrical power system comprising a current limiting diode.

FIG. 8 is a diagram of a third example electrical power system 400. Many of the components of the third electrical power system 400 are similar to or identical to the components of the first electrical power system 300, with like reference numerals indicating similar or identical components.

The electrical power system 400 comprises a controllable circuit interruption device 450. The controllable circuit interruption device 450 is configured to interrupt the fault current shortly after the development of the fault current in response to a determination that the electrical power system 400 is in a fault condition. The controllable circuit interruption device 450 may monitor an electrical current passing between the electrical power source 310 and the electrical network 330 in order to determine whether the electrical power system 400 is in the fault condition. However, the controllable circuit interruption device 450 is only able to respond to the development of the fault current and interrupt the fault current within a response time period of the controllable circuit interruption device 450. The response time period of the controllable circuit interruption device 450 is longer than the response time period of the current limiting diode 200. Accordingly, the current limiting diode 200 and the controllable circuit interruption device 450 are configured to co-operate in use so as to limit and then to interrupt a fault current passing between the electrical power source and the electrical network 330 in the fault condition. The current limiting diode 200 and the controllable circuit interruption device 450 provide the electrical power system 400 with a resettable protection system against faults originating from the electrical network 330 in the fault condition.

A safety-time margin of the electrical power system 400 is defined as a difference between the response time period of the controllable circuit interruption device 450 and the critical time period of the current limiting diode 200. A longer safety-time margin is associated with an improved safety of the electrical power system 400. As described above, the heat absorbed by the phase-change fill material 212 in the extreme operating condition of the current limiting diode 200 by means of the substantially constant-temperature heat absorption process lengthens the critical time period of the current limiting diode 200 and thereby lengthens the safety-time margin of the electrical power system 400.

Additionally, the provision of the phase-change material 212 within the current limiting diode 200 permits a controllable circuit interruption device having a response period which would not be suitable for use in conjunction with a conventional current limiting diode to be used in conjunction with the current limiting diode 200. In particular, the controllable circuit interruption device may comprise a controllable contactor which provides a physical circuit break (that is, Galvanic isolation) in an electrical power system but which may have a longer response time period than a critical time period of a conventional current limiting diode. The physical circuit break is associated with an improved safety of the electrical power system 400. In other embodiments the controllable circuit interruption device 450 may comprise a semiconductor switching device (e.g. a solid-state circuit breaker).

In the example of FIG. 8, an internal impedance of the electrical power source 310 is represented by a resistor 412 and the electrical energy delivery capacity of the electrical power source 310 is represented by a voltage source 414. The electrical power source 310 may comprise, for example, a battery, a capacitor and/or an ultracapacitor. Preferably, the electrical power source 310 comprises a battery (e.g. a high-density battery).

The electrical power system 400 may further comprise a power electronics converter 420. In the example shown in FIG. 8, the power electronics converter 420 comprises a DC to DC converter and the electrical network 330 is a DC electrical network. The DC to DC converter may comprise a plurality of transistors 421-424 and an inductor coil 429. The power electronics converter 420 provides a regulation function to the electrical power system 400, as described in further detail below. It will be appreciated that the power electronics converter 420 may otherwise comprise a DC to AC to DC converter or the like. In other examples, the power electronics converter 420 comprises an AC to DC converter. In further examples, the power electronics converter 420 comprises a DC to AC converter and the electrical network 330 is an AC electrical network.

In the arrangement of FIG. 8, the electrical power source 310 is configured to provide a first electrical potential difference to the power electronics converter 420. The power electronics converter 420 is configured to convert and/or regulate the electrical potential difference provided by the electrical power source 310 and provide a second electrical potential difference to the electrical network 330. Accordingly, the power electronics converter 420 provides a regulation function to the electrical power system 400. In particular, the power electronics converter 420 allows the first electrical potential difference provided by the electrical power source 310 to change while maintaining a substantially constant second electrical potential difference provided to the electrical network 330. The electrical network 330 may comprise at least one load component which benefits from being driven by a substantially constant electrical potential difference.

Also in the example shown in FIG. 8, the third example electrical power system 400 comprises a plurality of additional components. In FIG. 8, the plurality of additional components includes a first DC capacitor 472, a second DC capacitor 474, a third DC capacitor 476 and an earth ground 478. It will be appreciated that these components are shown and described for the purpose of illustration and are not to be construed as essential elements of the third electrical power system 400.

Figure 9:
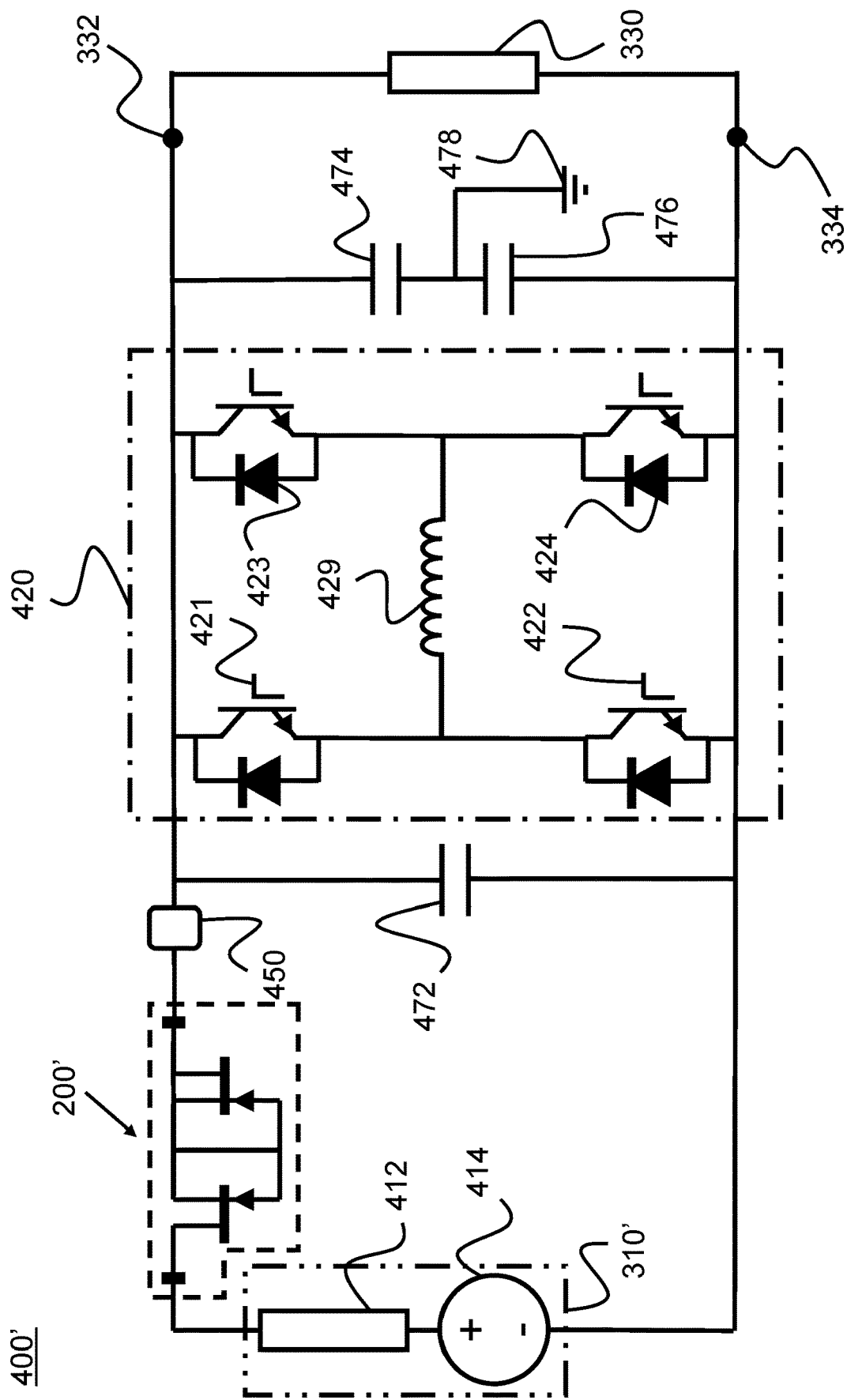
FIG. 9 is a diagram which shows a fourth example electrical power system comprising a bidirectional current limiting device.

FIG. 9 is a diagram of a fourth example electrical power system 400'. Many of the components of the fourth electrical power system 400' are similar to or identical to the components of the second electrical power system 300' and the third electrical power system 400, with like reference numerals indicating similar or identical components. The above description given with respect to the features and advantages of the second electrical power system 300' and the third electrical power system 400 applies, mutatis mutandis, to the features and advantages of the fourth electrical power system 400'.

Nevertheless, for the avoidance of doubt, the bidirectional current limiting device 200' and the controllable circuit interruption device 450 are configured to co-operate in use so as to limit and then to interrupt a fault current passing between the electrical power source 310 and the electrical network 330 in a fault condition of the fourth electrical power system 400'. In particular, the bidirectional current limiting device 200' is able to limit a fault current caused by a fault originating from the electrical network 330 (or the power electronics converter 420) or a fault current caused by a fault originating from the electrical power source 310' irrespective of an orientation of the bidirectional current limiting device 200' within the electrical power system 400'. Consequently, the bidirectional current limiting diode 200' and the controllable circuit interruption device 450 provide the electrical power system 400' with a more versatile resettable protection system against a fault current passing between the electrical power source 310 and the electrical network 330 in the fault condition.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A current limiting diode comprising a gate, a source, and a drain electrically connected to the source by an n-channel or p-channel; wherein the source and the gate are electrically connected by a fill structure comprising a phase-change fill material, and wherein the phase-change fill material is configured to absorb heat from the n-channel or p-channel by changing phase.

2. The current limiting diode of claim 1, wherein the phase-change fill material abuts the n-channel or p-channel for heat exchange therebetween.

3. The current limiting diode of claim 1, wherein the phase-change fill material comprises a material which is in a substantially solid phase at or about 125° C. but which transitions to a substantially liquid phase at a temperature which is greater than 125° C.

4. The current limiting diode of claim 1, wherein the fill structure further comprises a solid-phase fill material which is configured to remain in a solid phase as the phase-change fill material changes phase.

5. The current limiting diode of claim 1, wherein the drain and/or the source is provided with a heat sink comprising a phase-change heat sink material configured to absorb heat from the n-channel or p-channel via the drain and/or the source by changing phase.

6. The current limiting diode of claim 5, wherein the heat sink comprises a solid-phase heat sink material which is configured to remain in a solid phase as the phase-change heat sink material changes phase.

7. The current limiting diode of claim 1, wherein the phase-change heat sink material comprises a material which is in a substantially solid phase at or about 125° C. but which transitions to a substantially liquid phase at a temperature which is greater than 125° C.

8. The current limiting diode of claim 1, wherein the drain is electrically connected to the source by an n-channel.

9. A bidirectional current limiting device comprising a first current limiting diode and a second current limiting diode, wherein:
    each current limiting diode is in accordance with claim 1; and
    the source of the first current limiting diode is electrically connected to the source of the second current limiting diode.

10. An electrical power system comprising:
    the current limiting diode of claim 1;
    an electrical power source; and
    an electrical network, wherein the current limiting diode or the bidirectional current limiting device is configured to limit a fault current passing between the electrical power source and the electrical network in a fault condition.

11. The electrical power system of claim 10, further comprising a controllable circuit interruption device configured to interrupt the fault current in response to a determination that the electrical power system is in the fault condition.

12. The electrical power system of claim 11, wherein the electrical power source comprises a battery.

13. The electrical power system of claim 10, further comprising a power electronics converter.

14. An aircraft power and propulsion system comprising the current limiting diode of claim 1.

15. An aircraft comprising the current limiting diode of claim 1.

* * * * *